United States Patent Office 2,807,614
Patented Sept. 24, 1957

2,807,614

QUATERNARY AMMONIUM COMPOUNDS

Earl W. Lane, Philadelphia, Pa., assignor to Rohm & Haas Company, Philadelphia, Pa., a corporation of Delaware No Drawing. Application November 9, 1955, Serial No. 545,997

16 Claims. (Cl. 260—247)

This invention relates to N,N-bis(polyalkylphenyl-pentenyl)-N,N-dialkylammonium halides as new compositions. It further deals with a method of preparation of these compositions.

The compounds of the present invention may be represented by the formula

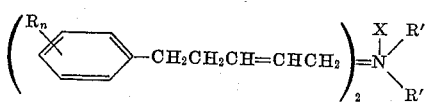

in which R is an alkyl group of no more than two carbon atoms, that is, a methyl or ethyl group, X is preferably a halogen atom having an atomic weight between about 35.5 and 127, that is, chlorine, bromine, or iodine, $n$ is an integer of two to three, and R' groups, taken individually, represent an alkyl group of no more than two carbon atoms, that is, a methyl or ethyl group, and, taken collectively, represent a saturated divalent aliphatic chain of four to five atoms which jointly with the amino nitrogen forms a five-to-six sided heterocyclic monoamine group. Divalent in the above sense is to be construed to mean $\alpha,\omega$ divalency, that is, one valence at each end of the chain.

The symbol X has been defined as preferably chlorine, bromine, or iodine. Chlorine is the preferred representation of X. It will be apparent to one skilled in the art that other anions may be employed such as sulfate, methylsulfate, phosphate, acetate, citrate, tartrate, and the like, which may be supplied directly or by metathesis with the halide form of the present compounds or by the use of an anion exchange resin. Generally, an anion having a group weight of no more than about 127 is desired.

The R' groups, taken singly, may represent an alkyl group of no more than two carbon atoms, that is, a methyl or ethyl group, in which case each of the R' groups may be the same or different. The R' groups, taken collectively and in conjunction with the amino nitrogen, may stand for a morpholino, thiamorpholino, pyrrolidinyl, or piperidino group, and these groups having a lower alkyl substituent, such as a methyl group.

The symbol R represents a methyl or ethyl group and, since $n$ represents the integer 2 or 3, there may be two or three R groups on the benzene ring of the present compounds. The R groups may be located at any positions on the benzene ring, the exact positions being not critical. It is entirely satisfactory to employ commercially available mixtures in which compounds are present having the R groups at different positions on the benzene ring.

The present compounds are preferably prepared by reacting a halopentenylpolyalkylbenzene with a dialkyl-aminopentenylpolyalkylbenzene in substantially equimolecular proportions to yield substantially quantitative results. Typical of the reactants that may be employed include chloropentenyltrimethylbenzene, chloropentenyldiethylbenzene, bromopentenyldimethylbenzene, iodopentenylmethylethylbenzene, bromopentenyltriethylbenzene, iodopentenyldimethylbenzene, dimethylaminopentenyltrimethylbenzene, diethylaminopentenyldimethylbenzene, morpholinopentenyltriethylbenzene, pyrrolidinylpentenylmethylethylbenzene, piperidinopentenyldiethylbenzene, ethylmethylaminopentenyltrimethylbenzene, diethylaminopentenyltrimethylbenzene, and the like. These reactants are known or prepared by known methods. Illustrative methods of preparing typical reactants that may be employed to prepare the quaternary ammonium compounds of this invention are shown in the following preparations in which parts by weight are used throughout.

PREPARATION A

There are added to a reaction vessel 120 parts of trimethylbenzyl chloride, 35 parts of anhydrous zinc bromide, and 72 parts of chloroform. The temperature of the reaction mixture is maintained at 9° to 20° C. while 44 parts of butadiene is introduced over a period of 26 minutes. The resultant mixture is stirred for two and a half hours after the butadiene addition and then washed with water, aqueous 10% sodium carbonate, and water again. The mixture is dried over anhydrous magnesium sulfate, filtered, and distilled. The product distills at 170° to 200° C. at 23 mm. pressure and is identified as trimethylphenylpentenyl chloride. There are also employed as reactants as above and with similar results triethylbenzyl chloride, triethylbenzyl bromide, dimethylbenzyl iodide, and diethylbenzyl chloride.

PREPARATION B

Into a reaction vessel there are introduced 64 parts of trimethylphenylpentenyl chloride, 100 parts of aqueous 25% dimethylamine, and 12 parts of sodium hydroxide. The reaction mixture is heated for four hours at 60° C. The organic layer is taken up in benzene. To the benzene is added aqueous 10% hydrochloric acid. The aqueous layer is separated from the benzene layer and then aqueous NaOH is added thereto. The amine product after drying over solid sodium hydroxide is distilled at 170° to 190° C. at 23 mm. pressure. The product corresponds to dimethylaminopentenyltrimethylbenzene. In a similar way and with similar results there are employed as reactants trimethylphenylpentenyl bromide and diethylamine, diethylphenylpentenyl chloride and dimethylamine, dimethylphenylpentenyl iodide and morpholine, triethylphenylpentenyl chloride and pyrrolidine, and trimethylphenylpentenyl chloride and piperidine.

The quaternary ammonium compounds of this invention are prepared by bringing together at a reacting temperature a halopentenylpolyalkylbenzene with a dialkyl-aminopentenylpolyalkylbenzene. Temperatures in the range of about 50° to 150° C. are generally employed with a range of about 60° to 125° C. preferred. It is frequently advantageous to employ the reflux temperatures when solvents are employed. Reaction times of about two to twenty-four hours are usually employed depending to a great extent on the reaction temperature, use of a solvent, and the specific reactants concerned. Either reactant may be used in excess, if desired, but the reaction occurs on a substantially equimolecular basis.

The present reaction is preferably conducted in the presence of a volatile inert organic solvent such as toluene, xylene, benzene, hexane, heptane, acetonitrile, isopropanol, butanol, dimethylformamide, isopropyl ether, and the like. Completeness of reaction can be determined by the amount of ionizable halide to be found in the reaction mixture. At the conclusion of the reaction the mixture is preferably washed with hexane, heptane, or the like, to remove any unreacted starting materials. The product is then isolated preferably by stripping off the volatile components under reduced pressure or on a steam bath.

It is somewhat advantageous in the present invention to employ the same polyalkylphenylpentenyl groups in both of the reactants, that is, when R and *n* have the same representation in each of the reactants, and thereby to provide a product that in its large groups is symmetrical about the nitrogen atom. It is generally preferred, also to employ R' as a methyl group and thereby to provide a product that in its small groups is symmetrical about the nitrogen atom. It is preferred to provide a compound in which there is the symmetry set forth above both as to the small and large groups, that is, when R and *n* are the same in each of the reactants and in which the R' groups are the same.

The quaternary ammonium products of this invention are generally white or gray waxy or pasty solids. These compounds are especially effective as bactericides particularly when used against *Micrococcus pyogenes* var. *aureus* and *Salmonella typhosa* as determined by standard phenol coefficient tests. The present compounds give values in the range of about 300 to 375 and above against *Salmonella typhosa* and 660 to 815 and above against *Micrococcus pyogenes* var. *aureus*. For instance, N,N-bis-(trimethylphenylpentenyl)-N,N-dimethylammonium chloride gave a value of 335 against *Salmonella typhosa* and 725 against *Micrococcus pyogenes*. The present compounds are useful fungicides against *Stemphylium sarcinaeforme* and *Monilinia fucticola*. These compounds exhibit valuable surface-active and cation-active wetting and emulsifying properties.

The compounds of this invention are valuable as detergent-sanitizers and may be employed in meat plants to sanitize cutting tables, grinders, and the like, in fruit processing operations, for instance, to wash and sanitize lemons, oranges, and grapefruits, and in dairy farms to sanitize dairy equipment and utensils.

A suitable detergent-sanitizer for use in meat plants includes, by weight, 5% of a compound of this invention, 2.5 to 5.0% of octylphenoxypolyethoxyethanol, 20 to 40% soda ash, 20 to 40% sodium metasilicate, and the remainder sodium tripolyphosphate. One ounce of this formulation is used per gallon of water. For sanitizing citrus fruit there is preferably used one part of a present compound in 5000 parts of water. For use in dairy farms, there may be used 10% of a quaternary ammonium compound of this invention, 10% of octylphenoxypolyethoxyethanol, 7% of trisodium phosphate, and 73% of water. One ounce of this solution is used per four gallons of water. The instant compounds in aqueous solution in amounts of about 0.5 to one ounce to one hundred pounds of dry fabrics, are excellent as a final diaper rinse to prevent diaper rash.

The quaternary ammonium compounds of this invention and the method for their preparation may be more fully understood from the following examples which are presented by way of illustration and not by way of limitation. Parts by weight are used throughout.

*Example 1*

There are added to a reaction vessel 15.3 parts of chloropentenyltrimethylbenzene, 100 parts of heptane, and 17.1 parts of dimethylaminopentenyltrimethylbenzene. The reaction mixture is heated at 90° to 98° C. for 16 hours and then the heptane is removed by distillation at reduced pressures leaving the product. The product contains 2.7% nitrogen (3.1% theoretical and is identified as N,N-bis(trimethylphenylpentenyl)-N,N-dimethylammonium chloride.

In a similar way, there is prepared N,N-bis(diethylphenylpentenyl)-N,N-ethylmethylammonium bromide from bromopentenyldiethylbenzene and ethylmethylaminopentenyldiethylbenzene.

*Example 2*

A mixture of 28 parts of bromopentenyldimethylbenzene, 150 parts of acetonitrile, and 32 parts of morpholinopentenyltriethylbenzene is heated at reflux for twenty hours. The solvent is stripped off leaving as the residue the product which corresponds to the compound having the formula

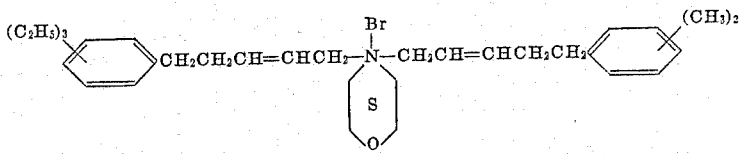

Analogously, there is made, from piperidinopentenyldiethylbenzene and iodopentenylmethylethylbenzene, the compound corresponding to the formula

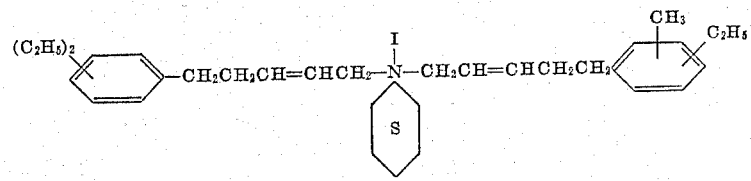

*Example 3*

There are introduced into a reaction vessel 32 parts of chloropentenyldiethylbenzene, 41.8 parts of ethylmethylaminopentenyltrimethylbenzene, and 160 parts of isopropanol. The reaction mixture is heated at 65° to 72° C. for twenty hours and then cooled and washed with heptane. The solvents are removed on a steam bath leaving the product which corresponds to the compound having the formula

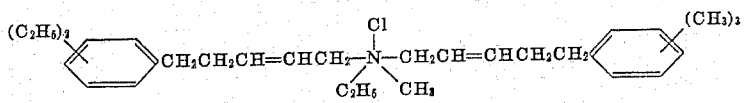

In like manner, there is prepared, from pyrrolidinylpentenylmethylethylbenzene and iodopentenyldimethylbenzene, the compound having the formula

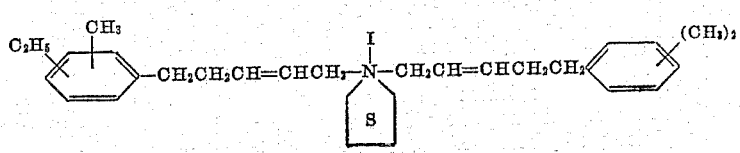

Example 4

A mixture of 26.5 parts of chloropentenyltriethylbenzene, 30.1 parts of diethylaminopentenyltriethylbenzene, and 140 parts of heptane is heated at reflux for eighteen hours. The heptane is stripped off leaving the product which may be named N,N-bis(triethylphenylpentenyl)-N,N-diethylammonium chloride and which corresponds to the formula

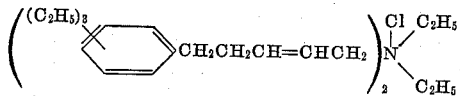

There is also prepared N,N-bis(triethylphenylpentenyl)-N,N-diethylammonium phosphate by passing the corresponding halide form of the quaternary ammonium compound through a bed of chloromethylated and aminated styrene-divinylbenzene anion-exchange resin in free base form and then titrating with phosphoric acid. The same compound is prepared by first converting the anion-exchange resin to the phosphate form and then passing the chloride form of the quaternary ammonium compound through a bed of the anion-exchange resin in phosphate form. The sulfate form of the present quaternary ammonium compounds may be prepared in like manner.

I claim:

1. A method for the preparation of a quaternary ammonium compound having the formula

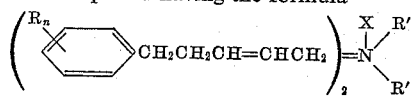

in which R is an alkyl group of no more than two carbon atoms, $n$ is an integer of two to three, X is an anion having a group weight of about 35.5 to 127, and the R' groups taken singly represent an alkyl group of no more than two carbon atoms and taken collectively represent a saturated aliphatic chain of $\alpha, \omega$ divalency having four to five atoms which jointly with the amino nitrogen forms a five-to-six-sided heterocyclic monoamine, which comprises bringing together at a reacting temperature in the range of about 50° to 150° C. a compound having the formula

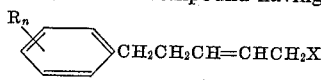

with a compound having the formula

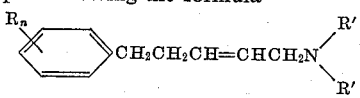

2. A method for the preparation of a quaternary ammonium compound having the formula

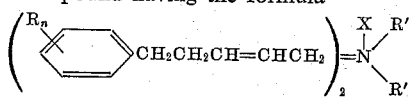

in which R is an alkyl group of no more than two carbon atoms, $n$ in an integer of two to three, X is an anion having a group weight of about 35.5 to 127, and the R' groups taken singly represent an alkyl group of no more than two carbon atoms and taken collectively represent a saturated aliphatic chain of $\alpha, \omega$ divalency having four to five atoms which jointly with the amino nitrogen forms a five-to-six-sided heterocyclic monoamine, which comprises bringing together at a reacting temperature in the range of about 50° C. to the reflux temperature of the reaction mixture in the presence of a volatile inert organic solvent a compound having the formula

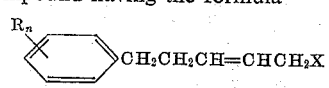

with a compound having the formula

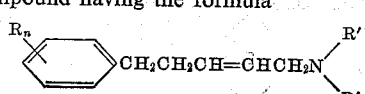

3. A method for the preparation of a quaternary ammonium compound having the formula

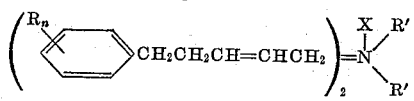

in which R is an alkyl group of no more than two carbon atoms, $n$ is an integer of two to three, X is a halogen having an atomic weight of about 35.5 to 127, and the R' groups taken singly represent an alkyl group of no more than two carbon atoms and taken collectively represent a saturated aliphatic chain of $\alpha, \omega$ divalency having four to five atoms which jointly with the amino nitrogen forms a five-to-six-sided heterocyclic monoamine, which comprises bringing together at a reacting temperature in the range of about 60° to 125° C. in the presence of a volatile inert organic solvent a compound having the formula

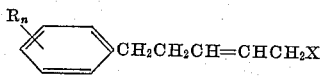

with a compound having the formula

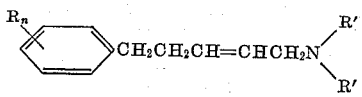

4. A method for the preparation of a quaternary ammonium compound having the formula

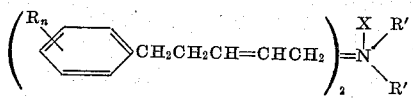

in which R is an alkyl group of no more than two carbon atoms, $n$ is an integer of two to three, X is a halogen having an atomic weight of about 35.5 to 127, and R' is an alkyl group of no more than two carbon atoms, which comprises bringing together at a reacting temperature in the range of about 60° to 125° C. in the presence of a volatile inert organic solvent a compound having the formula

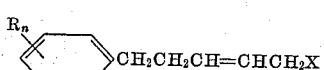

with a compound having the formula

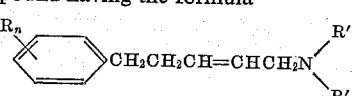

5. A method for the preparation of a quaternary ammonium compound having the formula

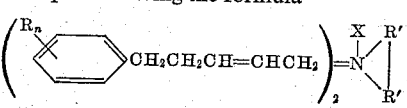

in which R is an alkyl group of no more than two carbon atoms, $n$ is an integer of two to three, X is a halogen having an atomic weight of about 35.5 to 127, and the R' groups together represent a saturated aliphatic chain of $\alpha, \omega$ divalency having four to five atoms which jointly with the amino nitrogen form a five- to six-sided heterocyclic monoamine, which comprises bringing together at a reacting temperature in the range of about 60° to 125° C. in the presence of a volatile inert organic solvent a compound having the formula

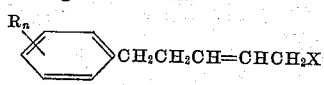

with a compound having the formula

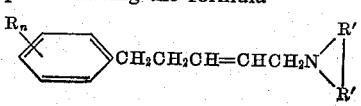

6. A method for the preparation of the quaternary ammonium compound having the formula

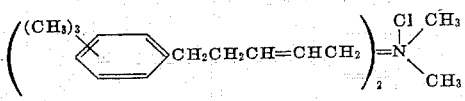

which comprises bringing together at a reacting temperature in the range of about 60° to 125° C. in the presence of a volatile inert organic solvent, chloropentenyltrimethylbenzene and dimethylaminopentenyltrimethylbenzene.

7. A method for the preparation of the quaternary ammonium compound having the formula

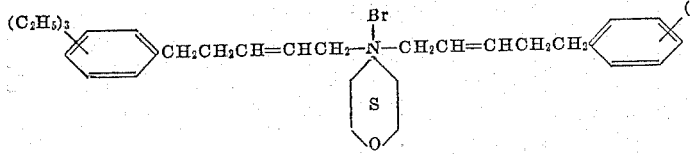

which comprises bringing together at a reacting temperature in the range of about 60° to 125° C. in the presence of a volatile inert organic solvent, bromopentenyldimethylbenzene and morpholinopentenyltriethylbenzene.

8. A method for the preparation of the quaternary ammonium compound having the formula

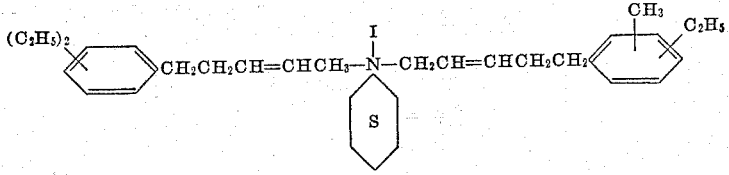

which comprises bringing together at a reacting temperature in the range of about 60° to 125° C. in the presence of a volatile inert organic solvent, iodopentenylmethylethylbenzene and piperidinopentenyldiethylbenzene.

9. A method for the preparation of the quaternary ammonium compound having the formula

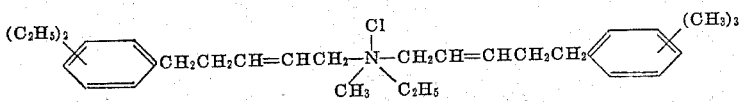

which comprises bringing together at a reacting temperature in the range of about 60° to 125° C. in the presence of a volatile inert organic solvent, chloropentenyldiethylbenzene and ethylmethylaminopentenyltrimethylbenzene.

10. As a new composition of matter the quaternary ammonium compound having the formula

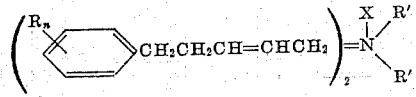

in which R is an alkyl group of no more than two carbon atoms, $n$ is an integer of two to three, X is an anion having a group weight of about 35.5 to 127, and the R' groups taken singly represent an alkyl group of no more than two carbon atoms and taken collectively represent a saturated aliphatic chain of $\alpha,\omega$ divalency having four to five atoms which jointly with the amino nitrogen forms a five- to six-sided heterocyclic monoamine.

11. As a new composition of matter the quaternary ammonium compound having the formula

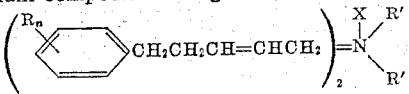

in which R is an alkyl group of no more than two carbon atoms, $n$ is an integer of two to three, X is a halogen having an atomic weight of about 35.5 to 127, and R' is an alkyl group of no more than two carbon atoms.

12. As a new composition of matter the quaternary ammonium compound having the formula

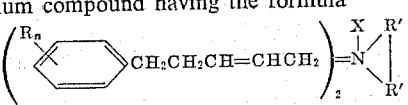

in which R is an alkyl group of no more than two carbon atoms, $n$ is an integer of two to three, X is a halogen having an atomic weight of about 35.5 to 127, and the R' groups together represent a saturated aliphatic chain of $\alpha,\omega$ divalency having four to five atoms which jointly with the amino nitrogen form a five- to six-sided heterocyclic monoamine.

13. As a new composition of matter the quaternary ammonium compound having the formula

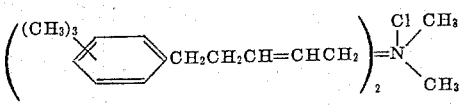

14. As a new composition of matter the quaternary ammonium compound having the formula

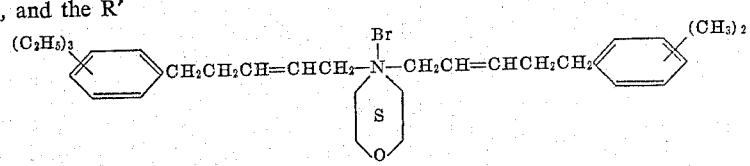

15. As a new composition of matter the quaternary ammonium compound having the formula

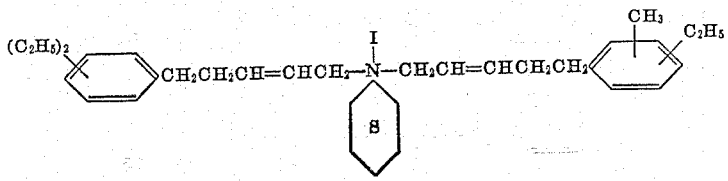

16. As a new composition of matter the quaternary ammonium compound having the formula
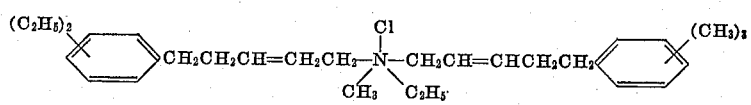
References Cited in the file of this patent
UNITED STATES PATENTS
| | | |
|---|---|---|
| 2,611,768 | Butler | Sept. 23, 1952 |
| 2,706,195 | Niederhauser | Apr. 12, 1955 |